Oct. 26, 1954    C. Q. SNEDEKER    2,692,632
TRACTION CLEAT FOR MOTOR VEHICLES
Filed Oct. 25, 1952

INVENTOR.
Claude Q. Snedeker
BY
Frease & Bishop
ATTORNEYS

Patented Oct. 26, 1954

2,692,632

UNITED STATES PATENT OFFICE 2,692,632

TRACTION CLEAT FOR MOTOR VEHICLES

Claude Q. Snedeker, Canton, Ohio

Application October 25, 1952, Serial No. 316,885

4 Claims. (Cl. 152—225)

The invention relates to road gripping devices for emergency application to the tires of motor vehicles, and more particularly to a traction cleat adapted to be quickly and easily attached to the drive wheels of a vehicle, whereby traction may be obtained in mud, sand or snow by preventing spinning of the driving wheels.

It is an object of the invention to provide a traction cleat with means for readily clamping it upon a pneumatic tire.

Another object is to provide such a device comprising a cleat adapted to fit transversely across the tread portion of a tire and having a rigid clamping jaw at one end thereof, and a movable clamping jaw having means for attaching it to the other end of the cleat.

A further object is to provide a traction device of this character in which the movable clamping jaw has a portion which is slidably telescoped within one end of the cleat and provided with a clamping bolt.

A still further object is to provide a traction cleat of the type referred to in which the movable clamping arm is mounted for oscillating movement relative to the cleat.

It is also an object of the invention to provide a traction cleat of this character adapted for application to dual tires.

Another object is to provide such a traction device comprising a ring upon which a plurality of the cleats may be mounted at any desired intervals around a tire.

The above objects together with others which will be apparent from the drawing and following description, or which may be later referred to, may be attained by constructing the improved traction cleat in the manner hereinafter described in detail and illustrated in the accompanying drawing, in which.

Referring now to the embodiments of the invention illustrated in the drawing, in which similar numerals refer to similar parts throughout, the cleat per se, as indicated at 10 is preferably formed of steel or other suitable metal, and may be of triangular cross section, as best shown in Fig. 2.

Figure 1:
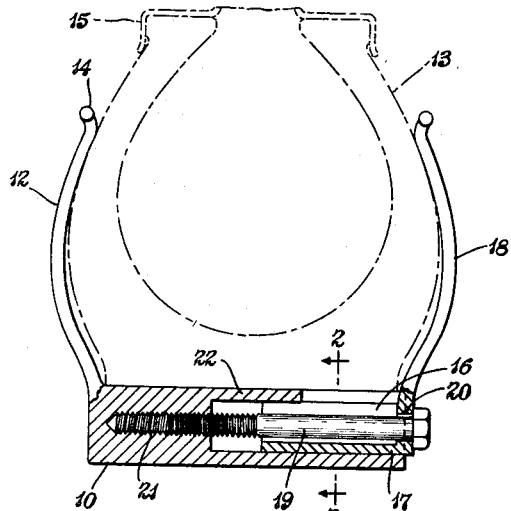
Fig. 1 is a sectional elevation of a traction cleat embodying the invention, showing the manner in which it may be clamped upon a tire.

A rigid clamping jaw is integrally formed at one end of the triangular cleat 10, and as shown in Fig. 1 is curved at 12 to fit around one side of a tire 13, and terminates in the out-turned end 14, disposed away from the tire at a point spaced from the wheel rim 15.

Figure 2:
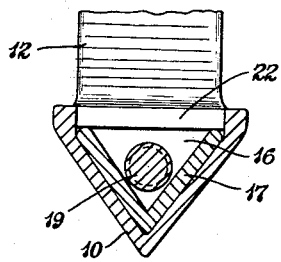
Fig. 2 is an enlarged, transverse section through the cleat, taken on the line 2—2, Fig. 1.

In the form of the device shown in Figs. 1 and 2, the opposite end of the triangular cleat 10 is hollow and open at the end as at 16 to telescopically receive the V-shape projection 17 upon the movable clamping jaw 18.

As shown in Fig. 1, the opening 16 in the cleat is of greater length than the V-shape projection 17 upon the movable clamping jaw 18, so as to permit the clamping jaws 12 and 18 to be tightly clamped upon both sides of the tire 13 by means of the clamping screw 19.

A clamping screw 19 is located through an opening 20 in the movable clamping jaw 18, and threaded into the tapped bore 21 in the cleat 10, for moving the movable jaw 18 toward the fixed jaw 12, in order to clamp the tire 13 therebetween as shown in Fig. 1.

It will be seen that as the screw 19 is tightened, the V-shape projection 17, of the movable jaw 18, will be telescoped within the hollow end 16 of the cleat and beneath the overhanging top wall 22 thereof, preventing outward tilting of the jaw 18 relative to the cleat.

Figure 4:
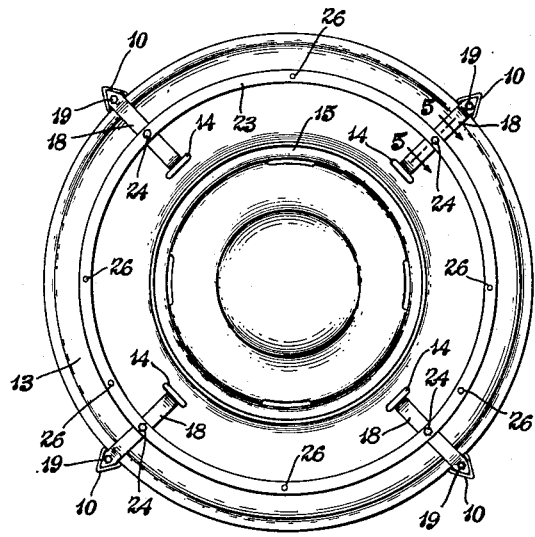
Fig. 4 is an elevation of a vehicle wheel showing the manner in which a plurality of the cleats may be held in spaced relation thereon by means of a ring.
Figure 5:
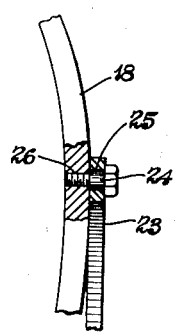
Fig. 5 is an enlarged, fragmentary section, taken as on the line 5—5, Fig. 4.

For the purpose of equally spacing a plurality of the cleats around a tire, as shown in Figs. 4 and 5, a ring 23, of a diameter less than the tire, may be located upon the outer side of the tire and connected to the movable jaws 18 of any desired number of cleats, at desired spaced points, by means of shouldered screws 24, located through apertures 25 in the jaws 18 and threaded into the tapped holes 26 in the ring.

The holes 26 are so located in the ring that two, three, four or any other desired number of cleats may be equally spaced around the tire. With this arrangement it will be apparent that any number of cleats may be attached to the ring 23 in desired spacing and held against movement upon the tire, relative to each other.

Figure 3:
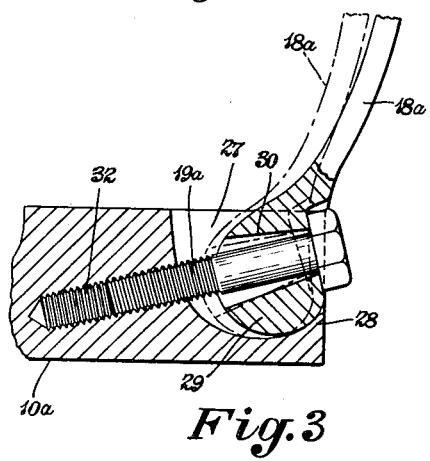
Fig. 3 is a fragmentary sectional elevation of a modified form of cleat.

In Fig. 3 is shown a slight modification of the invention in which the cleat 10a may be similar to the cleat 10, except that the end thereof opposite to the fixed clamping jaw is provided with a slot 27 open through the top and adjacent end of the cleat. An abutment 28 is formed in the bottom of the slot 27, at the open end thereof, for a purpose to be later explained.

The movable jaw 18a has a rounded head 29 at its lower end, located in the slot 27, and provided with a downwardly and inwardly flared opening 30, to receive the angularly disposed clamping screw 19a, which is screwed into the angularly disposed, tapped bore 32.

As the screw 19a is tightened, the rounded head 29 will rock within the slot 27, pivoting against the abutment 28. The flared opening 30 will permit the jaw 18a to swing inward, as indicated in broken lines in Fig. 3, into clamping engagement with the side of the tire.

The form of the cleat shown in Fig. 3 may be attached to a ring 23, in the manner shown in Figs. 4 and 5, for holding any desired number of the cleats equally spaced around a tire.

Figure 6:
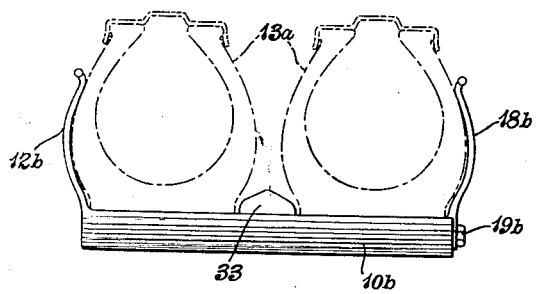
Fig. 6 is an elevation of a modification of the cleat adapted for application to dual tires.

For use on dual wheels, the cleat 10b may be of sufficient length to span two tires 13a, as indicated in Fig. 6. This cleat may be otherwise of the same construction as shown in either Fig. 1 or Fig. 2, having a fixed clamping jaw 12b at one end and a movable clamping jaw 18b at its other end, adapted to be moved into clamping engagement with the adjacent tire by the clamping screw 19b. A projection 33 may be located upon the inner side of the cleat for positioning between the dual tires 13a, as shown in Fig. 6.

From the above it will be obvious that when it is desired to use the device in an emergency, to obtain traction in mud, sand or snow, one or more of the cleats may be clamped by itself upon the tire of a driving wheel, as above described, or several of the cleats may be clamped at desired locations around the tire and attached to a ring, such as shown at 23, to hold them in relative spacing thereon.

The cleat or cleats may be easily and quickly applied to the tire while the same is in the mud, sand or snow, thus obviating the difficulty of placing tire chains on the drive wheels under such conditions.

It will also be seen that the cleats are firmly clamped upon the tire, insuring a non-movable road gripping member which will provide ample traction to move the vehicle onto solid ground, when the cleats may be easily removed.

It will also be obvious that the cleat is provided with a relatively wide, flat, tire engaging surface, thus preventing damage to the tire as well as insuring a large bearing surface.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A detachable traction device for attachment to a vehicle tire, comprising a ground engaging cleat of a length substantially the width of the tire tread and having a flat upper face for contact with the tire tread, a rigid clamping jaw integral with one end of the cleat for clamping engagement with one side wall of the tire, there being an opening in the other end of the cleat, an abutment at the outer end of said opening, a movable clamping jaw for clamping engagement with the opposite side wall of the tire, a rounded projection upon the movable clamping jaw rotatably mounted in said opening and contacting said abutment, and a clamping screw located through the projection on the movable clamping jaw and threaded into the cleat.

2. A detachable traction device for attachment to a vehicle tire, comprising a ground engaging cleat of a length substantially the width of the tire tread and having a flat upper face for contact with the tire tread, a rigid clamping jaw integral with one end of the cleat for clamping engagement with one side wall of the tire, there being an opening in the other end of the cleat, an abutment at the outer end of said opening, a movable clamping jaw for clamping engagement with the opposite side wall of the tire, a rounded projection upon the movable clamping jaw rotatably mounted in said opening and contacting said abutment, there being an inwardly flared aperture in said projection, and a clamping screw angularly located through the aperture in the projection on the movable clamping jaw and threaded into the cleat.

3. A detachable traction device for attachment to a vehicle tire, comprising a ground engaging cleat of a length substantially the width of the tire tread and having a flat upper face for contact with the tire tread, a rigid clamping jaw integral with one end of the cleat for clamping engagement with one side wall of the tire, there being an opening in the other end of the cleat, an abutment at the outer end of said opening, a movable clamping jaw for clamping engagement with the opposite side wall of the tire, a rounded projection upon the movable clamping jaw rotatably mounted in said opening and contacting said abutment, and a clamping screw located through the projection on the movable clamping jaw and threaded into the cleat, said opening being of greater length than the projection upon the movable clamping jaw, whereby the clamping jaws may be tightly clamped upon both sides of the tire by the clamping screw.

4. A detachable traction device for attachment to a vehicle tire, comprising a ground engaging cleat of a length substantially the width of the tire tread and having a flat upper face for contact with the tire tread, a rigid clamping jaw integral with one end of the cleat for clamping engagement with one side wall of the tire, there being an opening in the other end of the cleat, an abutment at the outer end of said opening, a movable clamping jaw for clamping engagement with the opposite side wall of the tire, a rounded projection upon the movable clamping jaw rotatably mounted in said opening and contacting said abutment, there being an inwardly flared aperture in said projection, and a clamping screw angularly located through the aperture in the projection on the movable clamping jaw and threaded into the cleat, said opening being of greater length than the projection upon the movable clamping jaw, whereby the clamping jaws may be tightly clamped upon both sides of the tire by the clamping screw.

References Cited in the file of this patent

UNITED STATES PATENTS

| Number | Name | Date |
|---|---|---|
| 1,109,699 | Norbury | Sept. 8, 1914 |
| 2,318,918 | Austin | May 11, 1943 |
| 2,343,131 | Austin | Feb. 29, 1944 |
| 2,467,654 | Boje | Apr. 19, 1949 |
| 2,473,782 | Boone | June 21, 1949 |
| 2,474,262 | Linderme | June 28, 1949 |
| 2,646,834 | Rusch | July 28, 1953 |